United States Patent
Chan et al.

(10) Patent No.: US 10,935,413 B2
(45) Date of Patent: Mar. 2, 2021

(54) NON-CONTACT TIME-OF-FLIGHT FUEL LEVEL SENSOR USING PLASTIC OPTICAL FIBER

(71) Applicant: The Boeing Company, Chicago, IL (US)

(72) Inventors: Eric Y. Chan, Mercer Island, WA (US); Dennis G. Koshinz, Bellevue, WA (US)

(73) Assignee: The Boeing Company, Chicago, IL (US)

(*) Notice: Subject to any disclaimer, the term of this patent is extended or adjusted under 35 U.S.C. 154(b) by 117 days.

(21) Appl. No.: 16/380,368

(22) Filed: Apr. 10, 2019

(65) Prior Publication Data
US 2020/0326224 A1 Oct. 15, 2020

(51) Int. Cl.
*G01F 23/292* (2006.01)
*B64D 37/00* (2006.01)
*B64D 43/00* (2006.01)

(52) U.S. Cl.
CPC ......... *G01F 23/2925* (2013.01); *B64D 37/00* (2013.01); *B64D 43/00* (2013.01)

(58) Field of Classification Search
CPC ........ G01F 23/00; G01F 23/28; G01F 23/284; G01F 23/2845; G01F 23/292;
(Continued)

(56) References Cited

U.S. PATENT DOCUMENTS

| 3,663,822 A | * | 5/1972 | Uchida | ................ G02B 6/4249 |
| | | | | 250/551 |
| 4,274,705 A | * | 6/1981 | Miller | ................. G01F 23/2927 |
| | | | | 385/12 |

(Continued)

FOREIGN PATENT DOCUMENTS

| CA | 1332205 | 10/1994 |
| DE | 3940455 A1 | 9/1990 |

(Continued)

OTHER PUBLICATIONS

Abstract, Zhao et al., "Novel light-leaking optical fiber liquid-level sensor for aircraft fuel gauging", Opt. Eng., vol. 52, No. 1, 014402 (Jan. 4, 2013); http://dx.doi.org/10.1117/1.OE.52.1.014402.

(Continued)

*Primary Examiner* — John R Lee
(74) *Attorney, Agent, or Firm* — Ostrager Chong Flaherty & Broitman P.C.

(57) ABSTRACT

A fuel sensing system utilizes non-contact plastic optical fiber (POF) to optically sense the level of liquid fuel in a fuel tank. In one implementation, the fuel level sensing system includes the following elements: (i) a high-speed and high-power red laser diode; (ii) an ultra-high-sensitivity photon-counting avalanche photodiode; and (iii) a large-diameter and large-numerical-aperture graded-index POF. The fuel level is sensed when the avalanche photodiode first detects impinging light reflected by the POF end face and then detects impinging light reflected by the fuel surface in response to emission of a laser pulse by the red laser diode. A time delay detection circuit calculates the time interval separating the respective times of arrival. A fuel level calculator calculates the fuel level based on the time interval provided by the time delay detection circuit.

25 Claims, 5 Drawing Sheets

(58) Field of Classification Search
CPC ............ G01F 23/2921; G01F 23/2922; G01F 23/2924; G01F 23/2925; G01F 23/2927; G01F 23/2928; B64D 37/00; B64D 37/02; B64D 37/04; B64D 43/00

See application file for complete search history.

(56) References Cited

U.S. PATENT DOCUMENTS

| | | | | |
|---|---|---|---|---|
| 4,498,764 | A * | 2/1985 | Bolkow | G01S 7/4818 356/5.06 |
| 4,692,023 | A * | 9/1987 | Ohtomo | G01F 23/292 356/5.11 |
| 4,727,247 | A * | 2/1988 | Johnston | G01B 11/02 250/227.23 |
| 4,839,515 | A * | 6/1989 | Kershaw | G01D 5/268 250/201.1 |
| 4,861,727 | A * | 8/1989 | Hauenstein | A61B 5/1459 436/136 |
| 4,870,292 | A | 9/1989 | Alpert et al. | |
| 4,880,971 | A * | 11/1989 | Danisch | G01F 23/292 340/619 |
| 4,928,006 | A | 5/1990 | Kershaw | |
| 4,942,306 | A | 7/1990 | Colbourne | |
| 4,950,885 | A * | 8/1990 | Kershaw | G01D 5/268 250/227.25 |
| 4,994,682 | A | 2/1991 | Woodside | |
| 5,054,319 | A * | 10/1991 | Fling | G01F 23/686 73/319 |
| 5,194,747 | A * | 3/1993 | Culpepper | G01F 23/292 250/577 |
| 5,291,031 | A * | 3/1994 | MacDonald | G01F 23/72 250/577 |
| 5,450,203 | A * | 9/1995 | Penkethman | G01B 11/00 356/614 |
| 5,648,844 | A * | 7/1997 | Clark | G01F 23/292 250/577 |
| 6,088,085 | A * | 7/2000 | Wetteborn | G01S 7/4811 356/5.01 |
| 6,172,377 | B1 | 1/2001 | Weiss | |
| 6,259,516 | B1 * | 7/2001 | Carter | G01F 23/292 250/577 |
| 6,274,880 | B1 | 8/2001 | Walker | |
| 6,333,512 | B1 | 12/2001 | Wirthlin | |
| 6,339,468 | B1 | 1/2002 | Clifford et al. | |
| 6,429,447 | B1 | 8/2002 | Nowak et al. | |
| 6,795,598 | B1 | 9/2004 | Devenyi | |
| 6,801,678 | B2 * | 10/2004 | Murshid | G01F 23/292 250/227.14 |
| 6,831,290 | B2 * | 12/2004 | Mentzer | G01F 23/292 250/227.14 |
| 7,049,622 | B1 | 5/2006 | Weiss | |
| 7,161,165 | B2 | 1/2007 | Wirthlin | |
| 7,259,384 | B2 * | 8/2007 | Hariram | G01F 23/706 250/573 |
| 7,573,565 | B1 * | 8/2009 | Mentzer | G01K 11/125 285/13 |
| 7,635,854 | B1 * | 12/2009 | Babin | G01F 23/2928 250/573 |
| 7,660,494 | B2 | 2/2010 | Anderson | |
| 7,710,567 | B1 | 5/2010 | Mentzer et al. | |
| 8,159,660 | B2 * | 4/2012 | Mimeault | G01S 17/10 356/139.1 |
| 9,228,956 | B2 * | 1/2016 | Weling | G01N 21/3577 |
| 2001/0022342 | A1 * | 9/2001 | Wirthlin | G01F 23/292 250/229 |
| 2003/0053064 | A1 * | 3/2003 | Nishimura | G01J 9/00 356/414 |
| 2004/0021100 | A1 * | 2/2004 | Gouzman | G01F 23/2927 250/573 |
| 2004/0075823 | A1 * | 4/2004 | Lewis | G01S 7/4868 356/5.01 |
| 2004/0156038 | A1 * | 8/2004 | Cao | G01J 1/4257 356/73.1 |
| 2005/0236591 | A1 | 10/2005 | Wirthlin | |
| 2007/0100580 | A1 * | 5/2007 | Marcus | H01L 22/12 702/170 |
| 2007/0145309 | A1 | 6/2007 | Zhang | |
| 2009/0076744 | A1 | 3/2009 | Anderson | |
| 2009/0084995 | A1 | 4/2009 | Cierullies et al. | |
| 2010/0006786 | A1 | 1/2010 | Babin | |
| 2010/0202726 | A1 * | 8/2010 | Egalon | G01N 21/648 385/12 |
| 2011/0101485 | A1 * | 5/2011 | Chan | H01L 31/108 257/471 |
| 2011/0103802 | A1 * | 5/2011 | Chan | G02B 6/4259 398/141 |
| 2014/0014777 | A1 | 1/2014 | Kreitmair-Steck et al. | |
| 2015/0100253 | A1 * | 4/2015 | Austerlitz | G01F 23/18 702/55 |
| 2015/0153212 | A1 * | 6/2015 | Cipullo | G06K 9/00771 382/203 |
| 2016/0138958 | A1 * | 5/2016 | Truong | G01F 22/00 250/227.28 |
| 2016/0139036 | A1 * | 5/2016 | Babin | G01N 21/7703 356/408 |
| 2017/0003157 | A1 * | 1/2017 | Cipullo | G01F 23/2928 |
| 2017/0227454 | A1 * | 8/2017 | Zakrzewski | G01N 21/31 |
| 2018/0224317 | A1 | 8/2018 | Chan et al. | |
| 2018/0299317 | A1 * | 10/2018 | Truong | G01F 23/2925 |

FOREIGN PATENT DOCUMENTS

| | | |
|---|---|---|
| EP | 3112822 A1 | 1/2017 |
| GB | 2293007 A | 3/1996 |
| WO | 2010051806 A1 | 5/2010 |

OTHER PUBLICATIONS

English Abstract of DE3940455.
References in U.S. Appl. No. 15/488,932.
Zhang et al., "A Multipoint Liquid Level Sensor Based on Two Twisted Polymer Optical Fibers in a Race-Track Helical Structure," Hindawi Journal of Sensors, vol. 2018, Article ID 4914382, pp. 1-4.
Montero et al., "A Polymer Optical Fiber Fuel Level Sensor: Application to Paramotoring and Powered Paragliding," Sensors, 2012, No. 12, pp. 6186-6197.
Laser Components, Silicon Geiger Mode Avalanche Photodiode Datasheet, downloaded from https://www.lasercomponents_com/fileadmin/user_upload/home/Datasheets/lcd/sap-series.pdf.
Ishigure et al., "High-Bandwidth, High-Numerical Aperture Graded-Index Polymer Optical Fiber," Journal of Lightwave Technology, vol. 13, No. 8, Aug. 1955, pp. 1686-1691.
Teng et al., "Liquid Level Sensor Based on a V-Groove Structure Plastic Optical Fiber", Sensors, 2018, No. 13, pp. 1-10.
Hergert et al., "APD arrays: Geiger-mode APD arrays detect low light," Aug. 1, 2008; downloaded from https://www.laserfocusworld.com/articles/print/volume-44/issue-8/features/apd-arrays-geiger-mode-apd-arraysdetect-low-light.html.
Bartlett et al., "Plastic Optical Fibre Sensors and Devices", Trans. Institute of Measurement and Control, vol. 22, No. 5, Jan. 1, 2000, pp. 431-457.
Ishigure et al., "High-Bandwidth High-Numerical Aperture Graded-Index Polymer Optical Fiber", J. Lightwave Technology, IEEE, vol. 13, No. 8, Aug. 1995, pp. 1686-1691.
Extended European Search Report dated Aug. 11, 2020 in European Patent Application No. 20155558.8 (European counterpart to the instant U.S. patent application).

* cited by examiner

NON-CONTACT TIME-OF-FLIGHT FUEL LEVEL SENSOR USING PLASTIC OPTICAL FIBER

BACKGROUND

This disclosure generally relates to systems and methods for measuring a level of liquid in a storage tank, such as a storage tank or other container. More particularly, this disclosure relates to systems and methods for liquid level measurement using an optical sensor.

A need to continuously measure the level of a liquid exists in many commercial and military applications. For example, liquid-level sensors are commonly used in the fuel tanks of aircraft, automobiles and trucks. Liquid-level sensors are also used to monitor liquid levels within storage tanks used for fuel dispensing, wastewater treatment, chemical storage, food processing, etc.

One existing solution is to use electrical capacitance probes placed inside the fuel tank of the airplane. This solution is heavy and expensive because the electrical capacitance probe is metallic and supported inside the fuel tank by metal mounting structures. In addition, the electrical capacitance probe requires electrical current to pass through the fuel tank, a feature that requires the use of heavily shielded electrical cables to feed through the fuel tank, adding weight to the airplane.

Another solution is to use optical capacitance probes in which the capacitance signal due to fuel level change is transmitted by glass optical fiber (GOF) through the fuel tank. Laser light is used to remotely power a solar cell inside the tank that in turn provides power to the capacitance sensing element and an optical transmitter. Therefore, the optical capacitance probe has electrical current generated inside the fuel tank, heavy shielding cables and enclosure of the solar cell and optical transmitter are required inside the fuel tank, which add weight. In addition, using GOF in the fuel tank locations has maintenance issues due to GOF breakage and resulting labor-intensive repair in the airplane's fuel tank locations.

In accordance with a common plastic optical fiber-based fuel level sensor design, the plastic optical fiber sensing element (hereinafter "POF sensor") is immersed in the fuel tank. The immersed POF sensor has a problem with the long-term degradation of the POF sensor due to chemical reaction with the airplane fuel. In addition, when the POF sensor is immersed in airplane fuel, the fuel gunk deposited on the POF sensor degrades the optical transmission property of the POF sensor, making the optical fuel level measurement unrepeatable and inaccurate.

There is room for improvements in systems and methods that use plastic optical fiber to optically sense the level of liquid fuel in a fuel tank.

SUMMARY

The subject matter disclosed herein is directed in part to a plastic optical fiber fuel level sensor capable of performing high-resolution airplane fuel level sensing without contacting the fuel in the fuel tank using the free-space optical time-of-flight principle. Because the POF sensor is not immersed in the fuel in the fuel tank, the non-contact POF sensor is neither susceptible to degradation due to the effect of "gunk" deposited on the POF sensor nor affected by change in index of refraction of the fuel due to a change in fuel quality. The non-contact POF sensor proposed herein also eliminates the effect of long-term degradation of the sensing element from chemical reaction with the fuel. The non-contact POF sensor disclosed in more detail below makes the fuel level measurement highly accurate, repeatable and safe.

The systems and methods disclosed herein use non-contact plastic optical fiber (POE) to optically sense the level of liquid fuel in a fuel tank. In accordance with one embodiment, the fuel level sensor system uses large-core, large-numerical-aperture graded-index POF to guide light into the fuel tank. Large-core, large-numerical-aperture graded-index POF has much larger diameter and is more ductile and flexible than glass optical fiber, which eliminates fiber breakage and maintenance issues for the fuel tank design. The fuel level sensor system further includes an ultra-high-sensitivity single-photon detector to detect light reflected from the end face of the POF and light reflected from the surface of the fuel. (As used herein, the term "single-photon detector" means a detector capable of detecting a single photon.) The system uses the time-of-flight of light that propagates from the POF end face to the reflecting surface and back to the POF end face to measure the distance between the end face of the POF and the fuel surface. That distance in turn is used to calculate the height of the liquid fuel in the fuel tank. This time-of-flight technique enables the system to measure the fuel level without the POF making contact with the fuel inside the fuel tank. This eliminates the concerns of fuel gunk deposition and long-term degradation of the POF by the fuel. The fuel level sensing systems and methods disclosed herein produce highly accurate fuel level measurements and do not require electricity to be fed through the fuel tank. The design proposed herein is also lighter in weight because the mounting of the POF sensor is simple and no heavily shielded electrical cable is required.

In accordance with one embodiment, the fuel level sensing system includes the following elements: (i) a high-speed and high-power red laser diode; (ii) an ultra-high-sensitivity photon-counting avalanche photodiode; and (iii) a large-diameter and large-numerical-aperture graded-index POF. The fuel level is sensed when the avalanche photodiode first detects impinging light reflected by the POF end face and then detects impinging light reflected by the fuel surface in response to emission of a laser pulse by the red laser diode. A time delay detection circuit calculates the time interval separating the respective times of arrival. A fuel level calculator calculates the fuel level based on the time interval provided by the time delay detection circuit.

An avalanche photodiode (APD) is a semiconductor photodetector that exploits the photoelectric effect to convert light to electricity and provide gain through avalanche multiplication. By applying a high reverse bias voltage, an APD shows an internal current gain effect (around 100) due to impact ionization (avalanche effect).

Although various embodiments of systems and methods that use a non-contact POF to optically sense the level of liquid fuel in a fuel tank will be described in some detail below, one or more of those embodiments may be characterized by one or more of the following aspects.

One aspect of the subject matter disclosed in detail below is a method for measuring a level of liquid contained inside a storage tank, comprising: storing a liquid in a storage tank with space above a surface of the liquid occupied by gas; at a first instant in time, emitting a laser pulse of photons from an end face of a plastic optical fiber toward the surface of the liquid; at a second instant in time subsequent to the first instant in time, detecting impingement on a photodetector of first photons from the emitted laser pulse which were reflected at the end face of the plastic optical fiber; at a third instant in time subsequent to the second instant in time, detecting impingement on the photodetector of second photons from the emitted laser pulse which were reflected at the surface of the liquid back into the plastic optical fiber; detecting a time delay between the times of arrival of the first and second photons; and determining a level of the liquid in the storage tank by processing data representing the time delay. The method may further comprise: storing data representing a geometry of the storage tank; measuring a density of the liquid in the storage tank; calculating a mass of liquid remaining in the storage tank based on data representing the geometry of the storage tank, the density of the liquid and the level of the liquid; and displaying a gauge that indicates the calculated mass of liquid in the storage tank.

In accordance with one embodiment of the method described in the immediately preceding paragraph: (1) the plastic optical fiber is a graded-index plastic optical fiber having a numerical aperture of at least 2.9; (2) the photodetector is an avalanche photodiode operating in a Geiger mode; and (3) the laser pulse is generated by a red laser diode operating around 650 nm, producing a laser pulse having wavelengths that include 650 nm and a width of 100 psec or less.

Another aspect of the disclosed subject matter is a system for measuring a level of liquid in a storage tank, comprising: a 1×2 optical fiber coupler disposed outside of the storage tank; a laser device optically coupled to the 1×2 optical fiber coupler and configured to emit a laser pulse of photons that propagates toward the 1×2 optical fiber coupler; a graded-index plastic optical fiber having one end that is optically coupled to the 1×2 optical fiber coupler and another end that has an end face disposed within an interior space of the storage tank; a photodetector optically coupled to the 1×2 optical fiber coupler and configured to generate electrons in response to impingement of photons on a surface of the photodetector; a time delay detection circuit operatively coupled to receive electrons from the photodetector and configured to generate time delay signals representing a time delay between impingement on the photodetector surface of first photons at a first time and second photons at a second time subsequent to the first time; and a computer system operatively coupled to receive the time delay signals from the time delay detection circuit and configured to calculate an estimated level of liquid in the storage tank based on the time delay. The system further comprises an airtight and light-tight fiber feed-through connector installed in a hole formed in a wall of the storage tank and adhesive that secures a distal end of the graded-index plastic optical fiber inside the airtight and light-tight fiber feed-through connector, wherein the airtight and light-tight fiber feed-through connector is configured so that an end face of the graded-index plastic optical fiber is exposed.

In accordance with one embodiment of the system described in the immediately preceding paragraph: the graded-index plastic optical fiber has a numerical aperture of at least 2.9; the photodetector is an avalanche photodiode configured to operate in a Geiger mode; and the laser device comprises a red laser diode that operates around 650 nm with a pulse width of 100 psec or less.

The system may further comprise a display device communicatively coupled to the computer system, wherein the computer system is further configured to execute the following operations: (a) storing data representing a geometry of the storage tank; (b) receiving data representing a measurement of a density of the liquid in the storage tank; (c) calculating a mass of liquid remaining in the storage tank based on the geometry of the storage tank, the density of the liquid and the estimated level of liquid; and (d) outputting an electrical signal representing the calculated mass of liquid in the storage tank to the display device.

A further aspect of the disclosed subject matter is an aircraft comprising a fuel tank and a fuel level sensing system for measuring a level of liquid in the fuel tank, wherein the fuel level sensing system comprises: a 1×2 optical fiber coupler disposed outside of the fuel tank; a laser device optically coupled to the 1×2 optical fiber coupler and configured to emit a laser pulse of photons that propagates toward the 1×2 optical fiber coupler; a graded-index plastic optical fiber having one end that is optically coupled to the 1×2 optical fiber coupler and another end that has an end face disposed within an interior space of the fuel tank; a photodetector optically coupled to the 1×2 optical fiber coupler and configured to generate electrons in response to impingement of photons on a surface of the photodetector; a time delay detection circuit operatively coupled to receive electrons from the photodetector and configured to generate time delay signals representing a time delay between impingement on the photodetector surface of first photons at a first time and second photons at a second time subsequent to the first time; and a computer system operatively coupled to receive the time delay signals from the time delay detection circuit and configured to calculate an estimated level of liquid in the fuel tank based on the time delay. The aircraft further comprises a display device communicatively coupled to the computer system, wherein the computer system is further configured to execute the following operations: storing data representing a geometry of the fuel tank; receiving data representing a measurement of a density of the liquid in the fuel tank; calculating a mass of liquid remaining in the fuel tank based on the geometry of the fuel tank, the density of the liquid and the estimated level of liquid; and outputting an electrical signal representing the calculated mass of liquid in the fuel tank to the display device.

In accordance with one embodiment of the aircraft described in the immediately preceding paragraph, the fuel level sensing system further comprises an airtight and light-tight fiber feed-through connector installed in a hole formed in a wall of the fuel tank and adhesive that secures a distal end of the graded-index plastic optical fiber inside the airtight and light-tight fiber feed-through connector, wherein the airtight and light-tight fiber feed-through connector is configured so that an end face of the graded-index plastic optical fiber is exposed. In one exemplary embodiment, the graded-index plastic optical fiber has a numerical aperture of at least 2.9, the photodetector is an avalanche photodiode configured to operate in a Geiger mode, and the laser device comprises a red laser diode.

Other aspects of systems and methods that use a non-contact POF to optically sense the level of liquid fuel in a fuel tank are disclosed and claimed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods that use a non-contact POF to optically sense the level of liquid fuel in a fuel tank are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The POF fuel level sensor disclosed herein senses the level of, but does not contact, the liquid fuel in a fuel tank using the free-space optical time-of-flight principle. Because the POF sensor is not immersed in the fuel in the fuel tank, the non-contact POF sensor is not susceptible to degradation due to chemical reaction with the fuel and is unaffected by change in index of refraction of the fuel due to change in fuel quality. The non-contact POF sensor disclosed in more detail below makes the fuel level measurement highly accurate, repeatable and safe. The proposed POF fuel level sensor also eliminates the use of electrical cables and electrical power inside the fuel tank, and eliminates EMI and lightning problems for the fuel tank. Furthermore, it reduces the size, weight and power of fuel level sensors used in current commercial airplanes. However, the technology disclosed herein may be applied to other types of liquid storage tanks and is not limited to use in fuel tanks onboard aircraft.

Figure 1:
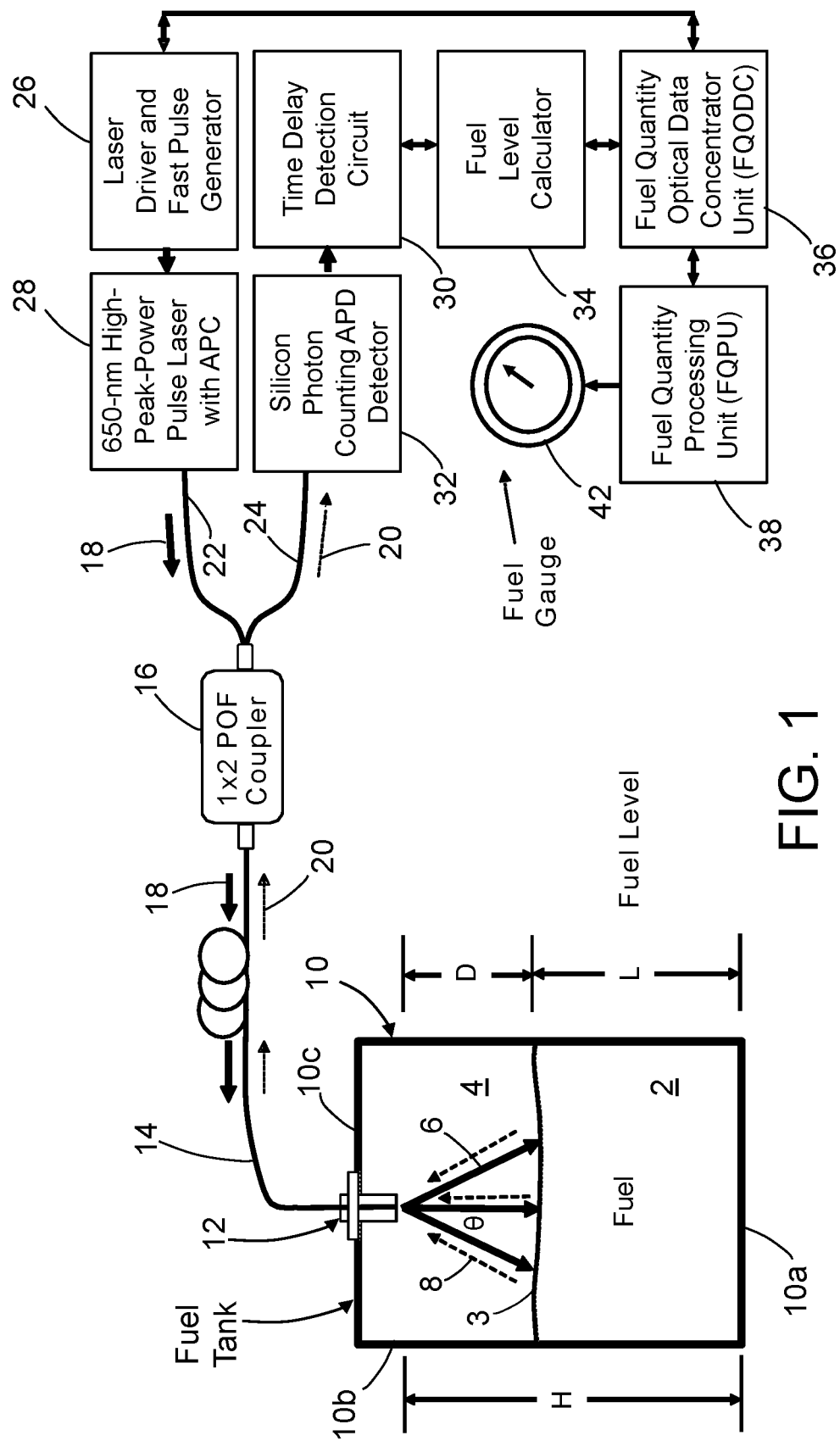
FIG. 1 is a diagram representing components of a time-of-flight fuel level sensing system that utilizes a non-contact POF to measure the level of liquid fuel in a fuel tank in accordance with one embodiment.

FIG. 1 is a diagram representing components of a time-of-flight fuel level sensing system that utilizes a POF 14 to measure the level of liquid fuel 2 in a fuel tank 10 in accordance with one embodiment. The fuel 2 has a fuel surface 3. The space above the fuel surface 3 is occupied by gas 4. The fuel tank 10 in this example has a bottom wall 10a, a side wall 10b and a top wall 10c. The cross-sectional profile of the side wall 10b may have any shape (e.g., circular, rectangular, trapezoidal, triangular, etc.). The distance of the fuel surface 3 from the internal surface of the bottom wall 10a of the fuel tank 10 determines the fuel level L indicated in FIG. 1.

An end section of the POF 14 extends into the interior of the fuel tank 10. The POF 14 is fed through a hole in the top wall 10c of the fuel tank 10 by means of a fiber feed-through connector 12 that is hermetic (meaning airtight) and light-tight (hereinafter "airtight and light-tight fiber feed-through connector 12"). As used herein, "light-tight" means that ambient light external to the fuel tank 10 cannot enter the fuel 10 by way of the hole in top wall 10c. The end face 1 (see FIG. 2) at the distal end of POF 14 is located at a height H seen in FIG. 1. Light 6 exiting the POF 14 as a conical beam of increasing diameter is indicated by three boldface arrows in FIG. 1. The left and right arrows indicate the envelope of a conical beam of light having an angle equal to 2θ. (It should be appreciated that the inclusion of three arrows is for the sake of illustration only and should not be construed to mean that three separate light beams or three separate photons are emitted from the end face of POF 14.) The emitted light 6 impinges on the fuel surface 3 in a circular area. The dashed arrows in FIG. 1 indicate light 8 reflected from fuel surface 3 back to the end face 1 (see FIG. 2).

The proximal end of POF 14 is connected and optically coupled to one side of a low-crosstalk 1×2 optical fiber coupler 16. The other side of the 1×2 optical fiber coupler 16 is connected and optically coupled to a pair of POFs 22 and 24. The waveguide inside the 1×2 optical fiber coupler 16 is configured such that POFs 22 and 24 are optically coupled to POF 14. In accordance with one proposed implementation, the POF 14 is a large-diameter (about 1 mm) large-numerical-aperture (large-NA) graded-index plastic optical fiber. One suitable large-NA (e.g., NA=0.29) graded-index POF is disclosed by Ishigure et al. in an article entitled: "High-Bandwidth, High-Numerical Aperture Graded-Index Polymer Optical Fiber," Journal of Lightwave Technology, Vol. 13, No. 8, August 1995, pp. 1686 to 1691. In accordance with one proposed implementation, POF 14 is a large-NA graded-index POF consisting of a poly(methyl methacrylate) tube filled with methyl methacrylate doped with diphenyl sulfide. The POF 14 (comprising cladding surrounding a core) is embedded in a light-tight avionics-grade fiber jacket (not shown in the drawings) for light shielding and environmental protection.

Referring again to FIG. 1, one of the two optical ports on the transceiver side of the 1×2 optical fiber coupler is connected to a high-peak-power laser device 28. The laser device 28 is connected to a laser driver 26 with a high-speed pulse generator. The laser device 28 also has an automatic power control (APC) circuit to stabilize the optical power of the laser pulse during variations in temperature. In accordance with one proposed implementation, the laser device 28 is a red laser diode. The red laser diode is operated at a wavelength of approximately 650 nm, where the loss of the POF 14 described in the previous paragraph is a minimum. The reason for selection of graded-index POF is because graded-index POF has a bandwidth suitable for a narrow laser pulse transmission. The laser device 28 is controlled by the laser driver 26 to emit a laser pulse 18 having a width of about 0.1 nsec or less.

The other of the two optical ports on the transceiver side of the 1×2 optical coupler is connected to a photodetector 32, which is used for detection of the return laser pulse 20 (which may consist of one or more photons) reflected from the fuel surface 3 and the end face of POF 14. The return laser pulse 20 is guided by POFs 14 and 24 back to the photodetector 32. In accordance with one proposed implementation, the photodetector 32 is a high-sensitivity photon-counting avalanche photodiode. As previously mentioned, an avalanche photodiode is a semiconductor photodetector that converts impinging photons into electrons. Light-tight shielding of POF 14 is needed to prevent extraneous photons from being detected by the photodetector 32.

The emitted light pulses 18 propagate through POF 22, the 1×2 optical fiber coupler 16 and POF 14, and into the airplane's fuel tank 10. The end face of POF 14 is held at an elevation H (measured from the inner surface of the bottom wall 10a of the fuel tank 10) by means of the airtight and light-tight fiber feed-through connector 12 that penetrates the top wall 10c of the fuel tank 10. The red light pulses coming out of the POF 14 propagate downward and illuminate the fuel surface 3. Because the graded-index POF described above has a large numerical aperture, the emitted light spreads over a large angle. Also, because of the large-NA design, the POF 14 also has large acceptance angle for the light (photons) reflected from the fuel surface 3. The large acceptance angle enhances the detection efficiency when detecting the fuel level L. The large-NA design of POF 14 is very important for the time-of-flight fuel level detection because the optical reflection of the fuel is not very high as compared to other types of reflective material.

The weak laser return pulse 20 received by POF 14 at the end face 1 (see FIG. 2) will propagate back to the photodetector 32 by way of the 1×2 optical fiber coupler 16 and POF 24. In accordance with one proposed implementation, the photodetector 32 is a silicon avalanche photodiode operating in the Geiger mode. The important advantage provided by a Geiger mode avalanche photodiode is the extremely high sensitivity capable of detecting a single photon. Another advantage of the Geiger mode avalanche photodiode is high dynamic range because it will not be easily saturated with a proper quenching resistor in series. Therefore, the Geiger mode avalanche photodiode will respond to weak or strong optical pulses with the same peak pulse response and same narrow pulse width (100 psec or less). These features are advantageous for time-of-flight detection of fuel level. With the Geiger mode avalanche photodiode, there is no requirement of an additional amplifier circuit in the receiver, simplifying the design of the receiver. The silicon Geiger mode avalanche photodiode also has maximum responsivity at 650 nm wavelength, which is well matched to the wavelength of the red laser diode of the transmitter.

In response to detection of the reflected optical pulses, the photodiode 32 outputs narrow electrical pulses with pulse width of 100 psec or less to a time delay detection circuit 30. The time delay detection circuit 30 determines the difference ($\Delta T_D$) between the time of arrival of the pulse reflected by the end face 1 and the time of arrival of the pulse reflected by the fuel surface 3. Then the fuel level calculator 34 determines the fuel level L based on the difference $\Delta T_D$ output by the time delay detection circuit 30. The difference $\Delta T_D$ is equal to the time-of-flight of a photon that propagates from the end face 1 to the fuel surface 3 and then back to the end face 1, each leg of the optical path being equal to a distance D (shown in FIG. 1). Since the speed of light is known, the distance D can be calculated from the difference $\Delta T_D$. The fuel level L in turn can be calculated from the height H and distance D.

The system depicted in FIG. 1 further includes a fuel quantity optical data concentrator 36 (hereinafter "FQODC 36"). The digital data representing the fuel level calculated by the fuel level calculator 34 is input to the FQODC 36, which is also monitoring the operation of the laser driver 26 to assure the proper generation of optical signal pulses required for the time-of-flight fuel level measurement. The FQODC 36 includes a computer or processor configured to process sensor data (including fuel level data received from the fuel level calculator 34 and other data as described below with reference to FIG. 4) and a non-transitory tangible computer-readable storage medium for storing the processed sensor data.

The system depicted in FIG. 1 further includes a fuel quantity quality processing unit 38 (FQPU) which provides signals to a fuel gauge 42 for the pilot to see the airplane's fuel level presented on a cockpit display. The fuel level information and other information needed to calculate fuel quantity (such as fuel density) are output from the FQODC 36 to the fuel quantity processing unit 38. The fuel quantity processing unit 38 includes a computer or processor configured to calculate the fuel quantity and a non-transitory tangible computer-readable storage medium for storing digital data representing the calculated fuel level. The fuel quantity processing unit 38 sends digital data representing the fuel quantity to the fuel gauge 42 for display.

In the case wherein the photodetector 32 is a high-sensitivity Geiger mode avalanche photodiode, it is very important to prevent ambient light from entering the POF 14. To provide light-tightness, the POF 14 is hermetically sealed by a light-tight jacket. Since the fuel tank 10 is totally closed during flight, there is no concern of unwanted light coupling into the POF 14 within the fuel tank 10, but feeding the POF 14 until the end face 1 is at the position shown in FIG. 1 (at a height H) involves the use of an airtight and light-tight fiber feed-through connector 12.

Figure 2:
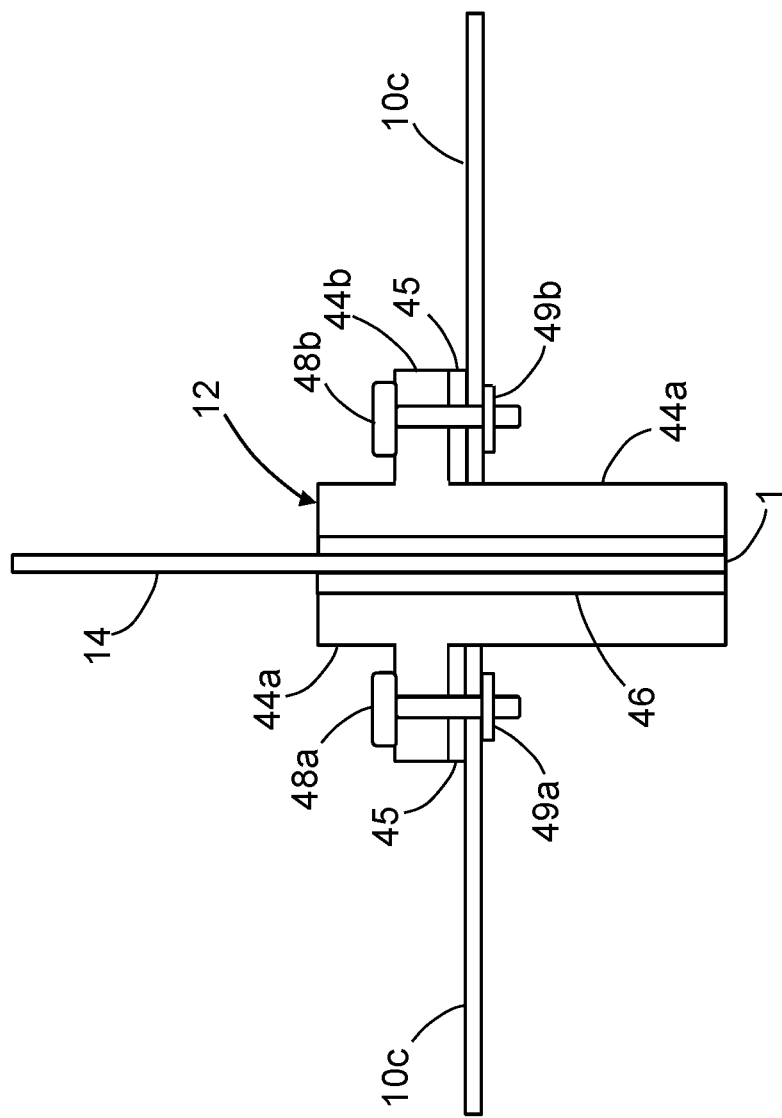
FIG. 2 is a diagram representing a sectional view (with hatching omitted) of a hermetic light-tight POF connector design for use in the time-of-flight fuel level sensing system partly depicted in FIG. 1.

FIG. 2 is a diagram representing a sectional view (with hatching omitted to avoid clutter) of the airtight and light-tight fiber feed-through connector 12 in accordance with one embodiment. The airtight and light-tight fiber feed-through connector 12 includes a fiber ferrule 44a in the form of a circular cylindrical tube and an annular flange 44b projecting radially outward from the fiber ferrule 44a. In one proposed implementation, the fiber ferrule 44a and annular flange 44b are integrally formed and made of stainless steel. An O-ring seal 45 is placed between the annular flange 44b and the external surface of the top wall 10c of the fuel tank 10. Then the resulting sandwich construction is fastened together using a multiplicity of nuts and bolts (e.g., four). Only two bolts 48a and 48b and two nuts 49a and 49b (respectively threadably engaged with the threaded shafts of bolts 48a and 48b) are shown in FIG. 2. The O-ring seal 45 is used to seal the airtight and light-tight fiber feed-through connector 12 to the top wall 10c. The distal end of POF 14 is fed until the end face 1 is at height H inside the fuel tank 10 (see FIG. 1) and attached tightly to the fiber ferrule 44a with high-quality opaque epoxy 46 to prevent light leaking into the fuel tank 10. The airtight and light-tight fiber feed-through connector 12 also prevents fuel vapor from leaking out of the fuel tank 10 for safety compliance.

In accordance with one configuration, an aircraft may be equipped with three fuel quantity optical data concentrators respectively installed in the left and right wings and inside the fuselage near the wing box, while the fuel quantity processing unit is located in the flight deck and communicates with all three fuel quantity optical data concentrators. The electronic components included in the fuel level sensing system depicted in FIG. 1 are located at safe distances from the fuel tanks. The lengths of the plastic optical fibers which optically couple each laser device/photodetector set to a respective fuel compartment should have a length which does not produce excessive optical loss of the laser pulse optical signal.

In accordance with one proposed implementation, the POF 14 is a large-diameter, large-NA graded-index plastic optical fiber (previously described) having a minimum NA approximately equal to 0.29. The numerical aperture determines the angle θ shown in FIG. 1, which angle θ is equal to half of the light emitting and accepting angle of the POF 14. In the case wherein NA=0.29, angle θ is about 17 degrees. Therefore, the full acceptance angle of POF 14 would be about 34 degrees. A larger numerical aperture is feasible by modification of the design of POF 14. It is also feasible to add a collimating lens at the tip of POF 14 if measuring a specific location on the fuel surface were desired.

As seen in FIG. 1, the end face 1 of POF 14 (best seen in FIG. 2) is at distance D from the fuel surface 3. D is the distance to be detected by the time-of-flight measurement system. H is the distance from end face 1 of POF 14 to the internal surface of the bottom wall 10$a$ of the fuel tank 10, where H is a constant which depends on the fuel tank's vertical height in the wing of the airplane. The fuel level L=H−D.

Figure 3:
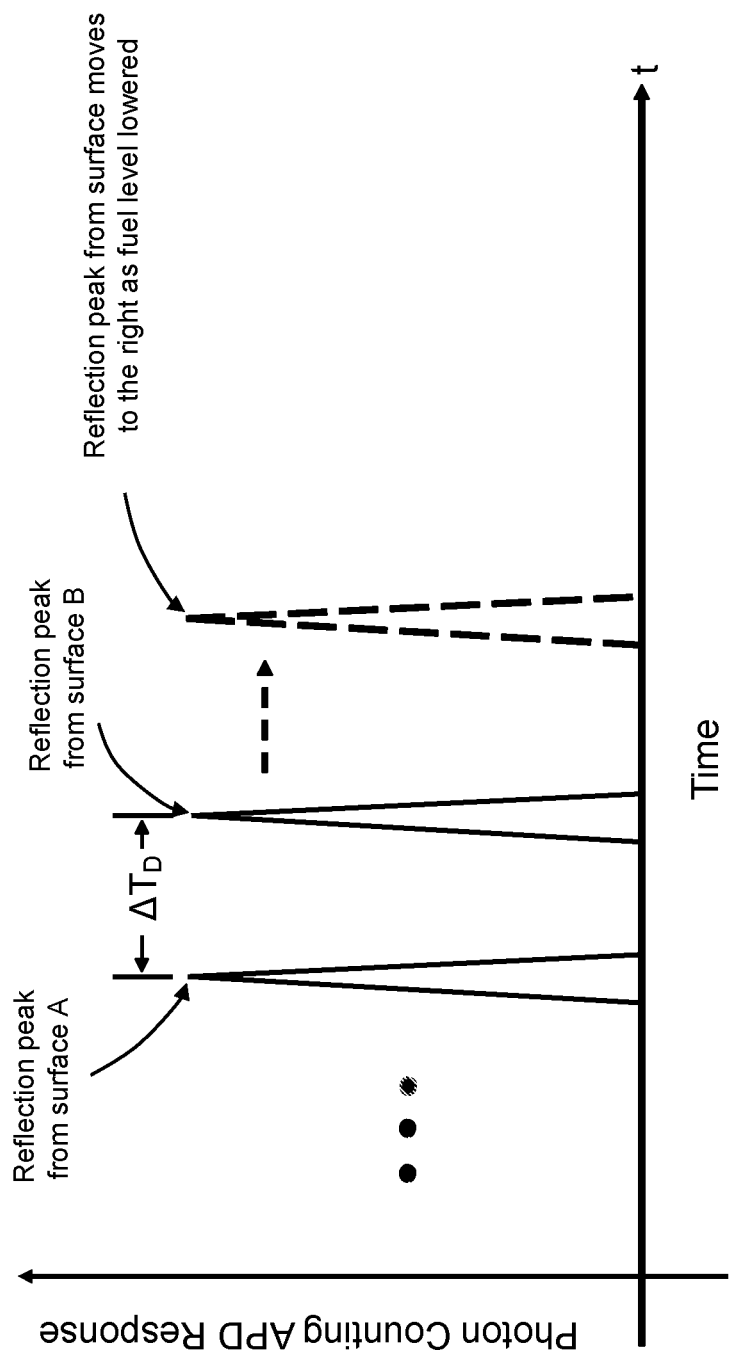
FIG. 3 is a graph showing an example response of a photon-counting avalanche photodiode to successive impingements of light emitted by one source at one time, but later reflected from respective surfaces A and B at different times.

With the transmitter generating a 0.1-nsec optical pulse from the laser device 28, the photodetector 32 will see multiple reflections from the POF 14. FIG. 3 shows the reflection peak signal versus time detected by the photodetector 32. The last two reflection peaks are due the plastic/gas interface (end face 1 of POF 14 shown in FIG. 2) and the gas/fuel interface (the fuel surface 3 shown in FIG. 2) respectively. The difference in time ($\Delta T_D$) between these two peaks is calculated as follows:

$$\Delta T_D = \frac{2D}{c} \quad (1)$$

where c is the speed of light in free space, and D is derived from Eq. (1) as follows:

$$D = \frac{c\Delta T_D}{2} \quad (2)$$

where $\Delta T_D$ is a parameter measured by peak detection circuits inside the time delay detection circuit 30 of the time-of-flight fuel level sensor.

Fuel level L is determined as follows:

$$L = H - D \quad (3)$$

where H is a constant related to the height of the fuel tank.

For a receiver that has a Geiger mode avalanche photodiode (hereinafter "Geiger mode APD receiver") which can detect a single photon at 650 nm (=0.65 micron), the receiver sensitivity in terms of the energy of one photon at 650 nm is calculated as follows:

$$E_{photon}(\text{eV}) = \quad (4)$$
$$hv = \frac{1.24}{\lambda(\text{in }\mu m)}\text{eV} = \frac{1.24}{0.65} \times 1.602 \times 10^{-19} J = 3.06 \times 10^{-19} J$$

where h is Planck's constant and v is the frequency of the photon at a wavelength of 0.65 m.

With a pulse width of 0.1 nsec, assuming one photon per pulse, the sensitivity of the Geiger mode APD receiver is $$\text{Sensitivity} = \frac{3.06 \times 10^{-19}}{10^{-10}} W = 3.06 \text{ nW} \quad (5)$$

The sensitivity in dBm is calculated as follows:

$$\text{Sensitivity(dB)} = 10 \times \log\left(\frac{3.06 \times 10^{-9}}{10^{-3}}\right) W = -55.14 \text{ dBm} \quad (6)$$

The single-photon detection sensitivity is effective for the time-of-flight fuel sensor because the reflectivity of airplane fuel is not very high compared to other types of reflective surfaces, such as metal surfaces or surfaces with reflective coatings. For a transmitter in which the laser device 28 is a red laser diode, operating the red laser diode with an optical pulse having peak power equal to 100 mW, with 1% reflection at the fuel surface and 1% of the reflected light being collected by the POF 14, the number of photons that is detected by the Geiger mode avalanche photodiode may be calculated as described below.

For example, assume that the length of the optical path from the laser device 28 to the end face 1 of the POF 14 is 16 meters and that maximum loss of the optical fiber cable (including POF 18 and POF 14) is 0.18 dB/m. Then the optical fiber loss may be estimated to be 16 m×0.18 dB/m=2.88 dB. Further assume that the insertion loss of the 2×1 optical fiber coupler 16 is about 5 dB. Therefore, the total loss of the laser pulse optical signal at the end face 1 of POF 14 would be (2.88+5) dB=7.88 dB or approximately 8 dB.

Assuming a 100-mW (20 dBm) peak optical power, the laser pulse optical signal at the end face 1 of POF 14 is (20−8) dBm=12 dBm=16 mW (approximately). With the assumption of 1% minimum reflection at fuel surface 3 and 1% minimum collection efficiency of the POF 14, the total reflected peak optical power collected at end face 1 is 16 mW×0.01×0.01=1.6×10$^{-3}$ mW=−28 dBm. With an 8-dB optical loss due to the optical path from the transceiver to end face 1, the power received at the Geiger mode APD is (−28−8) dBm=−36 dBm. The sensitivity of the Geiger mode APD is about −55.14 dBm as shown in Eq. (6); therefore, the Geiger mode APD has 19.14 (55.14−36) dB margin above its minimum sensitivity. This large optical detection margin makes the time-of-flight fuel level sensor's measurement very robust and reliable.

Using a laser pulse having a pulse width of about 0.1 nsec (100 psec), the fuel level detection resolution of the time-of-flight sensor is calculated as follows:

$$d_r \leq \frac{c \times t_{pw}}{2} \quad (7)$$

where $d_r$ is the fuel level resolution, c is the speed of light and $t_{pw}$ is the width of the laser pulse. Assuming a laser pulse width of 0.1 nsec, the resolution of the time-of-flight sensor is $$d_r \leq \frac{(3 \times 10^8) \times (10^{-10})}{2} m = 1.5 \times 10^{-2} m = 1.5 \text{ cm} \quad (8)$$

Resolution better than 1.5 cm is achievable using laser pulses having widths shorter than 0.1 nsec (100 psec).

To ensure safe transmission of the optical pulse into the fuel tank, the average optical power may be calculated and compared to a threshold. With 16-mW peak optical power illuminating the fuel surface, the laser transmitter is designed to send out one pulse at 1 msec (repetition rate is 1 msec per pulse), with a 100-psec optical pulse width. Under these conditions, the average optical power illuminating the fuel surface is calculated as follows:

$$P_{avg} \leq \frac{(16 \times 10^{-3}) \times (1 \times 10^{-10})}{10^{-3}} \, W = 1.6 \times 10^{-9} \, W = 1.6 \, \text{nW} \quad (9)$$

where $P_{avg}$ is the average optical power at the fuel surface. Since 1.6 nW of average optical power is much lower than the allowable safety limit (about 4 mW) of optical power for fuel illumination, the time-of-flight fuel level sensor disclosed herein may be designed for safety compliance.

The end face of POF 14 may be installed in a fuel tank onboard an airplane along with a temperature sensor and a densitometer. The fuel level and fuel density data and geometry of the fuel tank can then be used to compute the estimated quantity (i.e., mass) of fuel in the fuel tank. (In order to measure the mass of the fuel for engine consumption and range calculation, the system can use measurements of fuel level and fuel density.) In addition, an airplane can be retrofit by removing existing electrical fuel level sensors and installing optical fuel level sensors in their place. In accordance with one fuel level sensor configuration, the locations of the respective sensors in the wing tank and the center tank of an airplane dictate the height of the end face 1 of POF 14. In the baseline configuration there would be a one-to-one replacement of each electrical sensor by an optical sensor, eliminating weight from the wiring and supporting brackets, and eliminating electromagnetic effects from lightning, shorting and fraying of electrical wiring. The use of optical fibers instead of electrical wires also eliminates any safety hazards due to electrical fault conditions.

Figure 4:
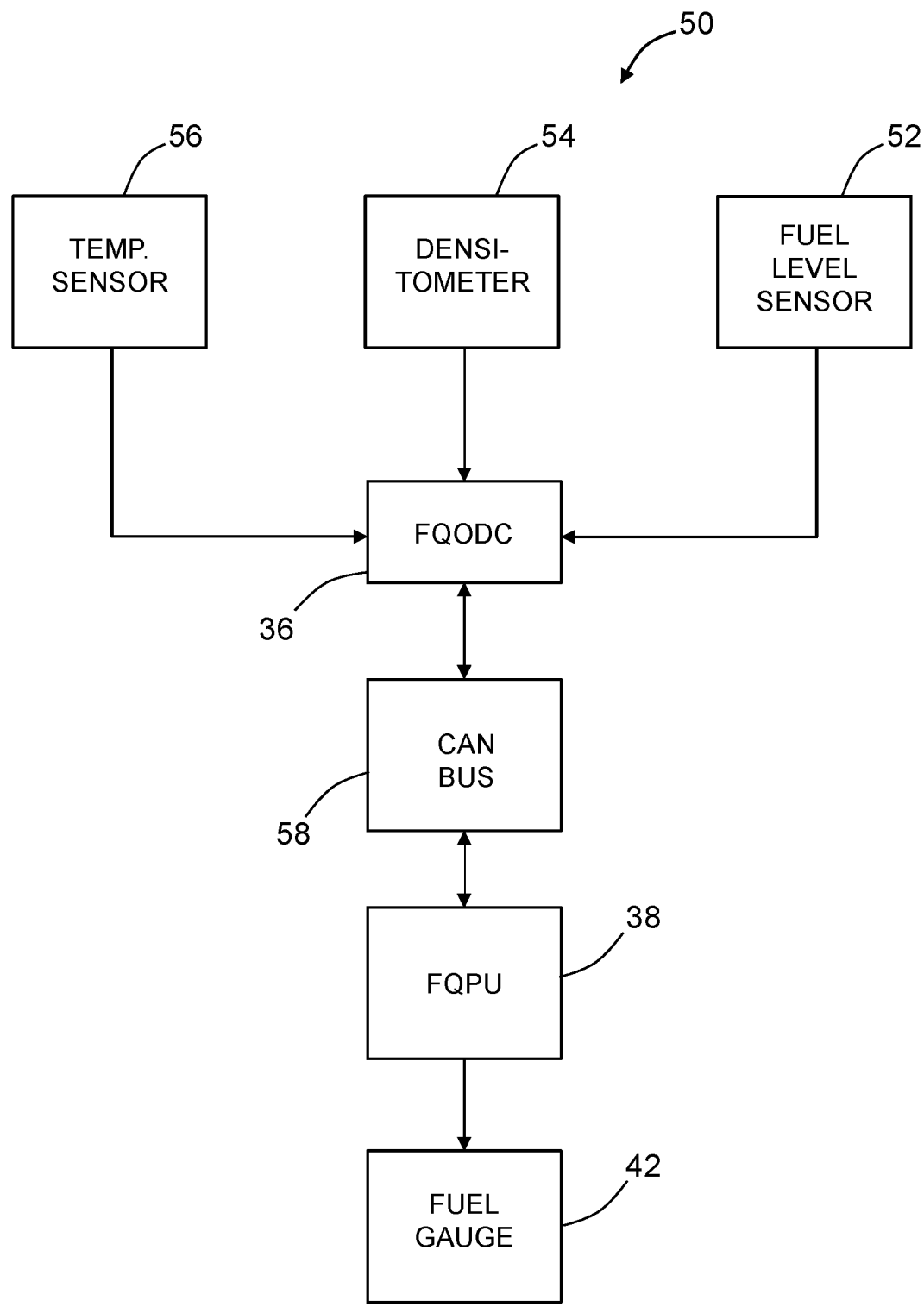
FIG. 4 is a block diagram identifying some components of a system for providing a pilot with an indication of the estimated quantity of fuel remaining in the fuel tanks.

FIG. 4 is a block diagram representing components of a system for measuring a quantity of fuel in a fuel tank in accordance with one embodiment. The system includes a fuel level sensor 52 that outputs electrical signals representing the level of fuel in a fuel tank in the manner described above. In accordance with one embodiment, the fuel level sensor 52 identified in FIG. 4 includes the following components identified in FIG. 1: POF 14, 1×2 optical fiber coupler 16, POFs 22 and 24, laser device 28, laser driver 26, photodetector 32, time delay detection circuit 30 and fuel level calculator 34. Thus, the fuel level data output by the fuel level calculator 34 is the output of the fuel level sensor 52.

In addition, the system partly depicted in FIG. 4 includes a densitometer 54 that outputs electrical signals representing the density of the fuel in the fuel tank and a temperature sensor 56 that outputs electrical signals representing the temperature of the fuel in the fuel tank. Each of these sensors may be incorporated in a respective line replaceable unit (LRU). These LRUs are connected to a FQODC 36. A fuel quantity processing unit 38 is in communication with FQODC 36. The fuel quantity processing unit 38 may be a dedicated microprocessor or a general-purpose computer configured to process signals received from the sensors.

In accordance with the embodiment depicted in FIG. 4, the FQODC 36 communicates with a fuel quantity processing unit (FQPU) 38 by way of a multi-master serial bus known as a CAN bus 58. For this purpose, the FQODC 36 and the fuel quantity processing unit 38 may each incorporate a controller and a transceiver of the type used in a controller area network (CAN). Such a CAN controller and CAN transceiver are referred to herein as a "CAN node". The FQODC 36 has different dedicated analog circuits to separately measure the temperature, density, and level of the fuel. The analog values of these parameters are converted to digital values, packed in a data field and transmitted via the CAN bus 58 to the fuel quantity processing unit 38. The ARINC 845 CAN bus is one example of a simple avionic digital data bus that can be used, but in the alternative, any other digital data bus such as ARINC 425 or ARINC 664 may be used.

In accordance with the CAN communications protocol, each CAN node is able to send and receive messages, but not simultaneously. A message or frame consists primarily of an identifier, which represents the priority of the message, and a number of data bytes. The message is transmitted serially onto the CAN bus 58 by the CAN transceiver and may be received by all CAN nodes. Each CAN node connected to CAN bus 58 waits for a prescribed period of inactivity before attempting to send a message. If there is a collision (i.e., if two nodes try to send messages at the same time), the collision is resolved through a bit-wise arbitration, based on a preprogrammed priority of each message in the identifier field of the message. The message that contains the highest priority identifier always wins bus access.

The sensor data acquired by fuel level sensor 52, densitometer 54 and temperature sensor 56 is formatted in accordance with the CAN communications protocol to form CAN messages, which are broadcast onto the CAN bus 58 and received by the fuel quantity processing unit 38. The fuel quantity processing unit 38 is configured to estimate the mass of fuel remaining in the fuel tank (or compartment thereof) based on the measured fuel density, the known geometry of the fuel tank (or compartment thereof) and the measured fuel level h. For example, the volume of fuel remaining can be computed based on the known geometry and measured fuel level, and then the mass of fuel remaining will be equal to the product of volume and density. An electrical signal representing the estimated mass of remaining fuel is output from the fuel quantity processing unit 38 to a fuel gauge 42. The fuel gauge 42 may take the form of a display device having a display processor programmed to display the measurement results (e.g., the fuel level or the fuel quantity) graphically and/or alphanumerically on a display screen.

The fuel quantity processing unit 38 may be a computer or part of a flight control system located on an aircraft. In identifying the amount of fuel present in an irregular-shaped fuel tank, the fuel quantity processing unit 38 may execute various routines to calculate the amount of fuel present based on optical power data received from multiple fuel level sensors 52 optically coupled to various compartments of the fuel tank 10. The fuel information processing software may include routines that take into account the shape of the fuel tank 10 to determine the amount of fuel remaining in the fuel tank 10. The fuel information processing software may further include routines for calibrating processes to form a baseline before a first use or to maintain accuracy of fuel readings. The readings provided by the fuel quantity processing unit 38 to the fuel gauge 42 may be integrated or averaged before presentation and may be provided at different time intervals.

A wing fuel tank system that uses electrical sensors can be retrofitted by substituting the optical sensors disclosed herein. Double shielded electrical wiring for the electrical sensors can be replaced with light and flexible plastic optical fiber, eliminating weight from the wiring and supporting brackets, and eliminating electromagnetic effects from lightning, shorting, fraying of electrical wiring.

In summary, a non-contact POF airplane fuel level sensor has been disclosed which uses the time-of-flight principle. This fuel level sensor is capable of detecting the fuel level with high resolution, high accuracy, good long-term stability and highly safe operation. Using large-diameter large-NA graded-index POF, the time-of-flight fuel level sensor has low maintenance cost because it eliminates the problem of fiber breakage encountered in glass optical fiber fuel sensors. The time-of-flight fuel level sensor is not in contact with the fuel, thereby eliminating the problem of sensor degradation due to fuel gunk deposition and chemical reaction of the fuel with the POF sensors.

The fuel level calculator 34 may comprise one or more dedicated microprocessors or one or more general-purpose computers, and may calculate the measured level (i.e., height) of the fuel by using a look-up table, a calibration curve, or by solving equations, as appropriate. The fuel gauge 42 displayed in the cockpit may be controlled to indicate the amount of fuel present within the fuel tank 10 based on the sensor data received by the FQODC 36.

Each of the optical fibers is a flexible, optically transparent or translucent fiber made of extruded plastic. It can function as a waveguide or light pipe to transmit light between the two ends of the fiber. Optical fibers typically include a transparent or translucent core having a relatively higher index of refraction surrounded by a transparent or translucent cladding material having a relatively lower index of refraction. Light is kept in the core by total internal reflection. This causes the optical fiber to act as a waveguide.

In the example embodiment shown in FIGS. 1 and 4, plastic optical fibers are used to measure the level of fuel in a fuel tank 10. In other embodiments, the same apparatus may be used to detect other liquids. For example, the system described above may be used to detect the presence of water in a container or hydraulic fluids in a storage tank for a hydraulic system. The illustration of detecting fuel in a fuel tank is presented for purposes of illustration and not meant to limit the manner in which the system shown in FIGS. 1 and 4 may be used.

Figure 5:
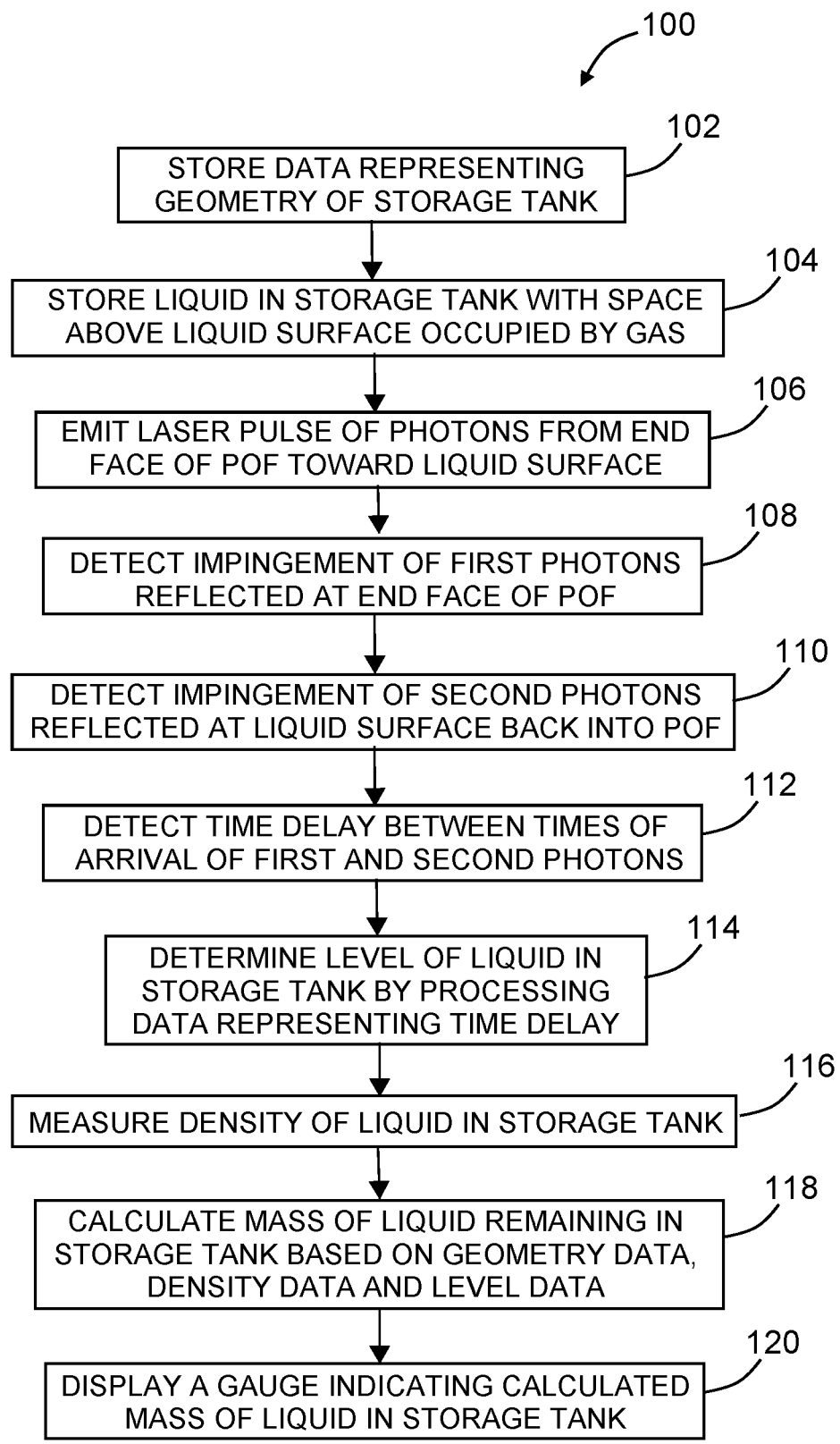
FIG. 5 is a flowchart identifying steps of a method for displaying a gauge indicating a quantity of liquid in a storage tank in accordance with one embodiment.

More generally, FIG. 5 is a flowchart identifying steps of a method 100 for displaying a gauge indicating a quantity of liquid in a storage tank in accordance with one embodiment. Initially, data representing a geometry of the storage tank is stored in a non-transitory tangible computer-readable storage medium accessible to a computer (step 102). A liquid is stored in the storage tank with space above a surface of the liquid occupied by gas (step 104). At a first instant in time, a laser pulse of photons is emitted from an end face of a plastic optical fiber toward the surface of the liquid (step 106). At a second instant in time subsequent to the first instant in time, impingement on a photodetector is detected of first photons from the emitted laser pulse which were reflected at the end face of the plastic optical fiber (step 108). At a third instant in time subsequent to the second instant in time, impingement on the photodetector is detected of second photons from the emitted laser pulse which were reflected at the surface of the liquid back into the plastic optical fiber (step 110). Then a time delay between the times of arrival of the first and second photons is determined (step 112). A level of the liquid in the storage tank is then determined by processing the data representing the time delay (step 114). In addition, a density of the liquid in the storage tank is measured (step 116). A mass of liquid remaining in the storage tank is then calculated based on data representing the geometry of the storage tank, the density of the liquid and the level of the liquid (step 118). A gauge is displayed that indicates the calculated mass of liquid in the storage tank (step 120).

While systems and methods that use a non-contact POF to optically sense the level of liquid fuel in a fuel tank have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., non-transitory tangible computer-readable storage medium) for storing a program which is readable by the processing unit. For example, the fuel level calculator 34, fuel quantity optical data concentrator 36 and fuel quantity processing unit 38 shown in FIG. 1 may be separate processors or computers which are communicatively coupled to form a "computer system".

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for measuring a level of liquid contained inside a storage tank, comprising:
   storing a liquid in a storage tank with space above a surface of the liquid occupied by gas;
   at a first time, emitting a laser pulse of photons from a laser device, which laser pulse propagates along a length of a plastic optical fiber to an end face of the plastic optical fiber that overlies the surface of the liquid;
   at a second time subsequent to the first time, detecting impingement on a photodetector of first photons from the laser pulse which were reflected at the end face of the plastic optical fiber;
   at a third time subsequent to the second time, detecting impingement on the photodetector of second photons from the laser pulse which were reflected at the surface of the liquid back to the end face of and into the plastic optical fiber;
   detecting a time delay between the times of arrival of the first and second photons; and determining a level of the liquid in the storage tank by processing data representing the time delay.

2. The method as recited in claim 1, wherein the plastic optical fiber is a graded-index plastic optical fiber having a numerical aperture of at least 2.9.

3. The method as recited in claim 1, wherein the photodetector is an avalanche photodiode operating in a Geiger mode.

4. The method as recited in claim 1, wherein the laser pulse is generated by a red laser diode.

5. The method as recited in claim 4, wherein the red laser diode operates around 650 nm.

6. The method as recited in claim 1, wherein the laser pulse has wavelengths that include 650 nm and a width of 100 psec or less.

7. The method as recited in claim 1, further comprising:
storing data representing a geometry of the storage tank;
measuring a density of the liquid in the storage tank;
calculating a mass of liquid remaining in the storage tank based on data representing the geometry of the storage tank, the density of the liquid and the level of the liquid; and
displaying a gauge that indicates the calculated mass of liquid in the storage tank.

8. The method as recited in claim 1, wherein the liquid is fuel and the storage tank is a fuel tank onboard an airplane.

9. A system for measuring a level of liquid in a storage tank, comprising:
a 1×2 optical fiber coupler disposed outside of the storage tank;
a laser device optically coupled to the 1×2 optical fiber coupler and configured to emit a laser pulse of photons that propagates toward the 1×2 optical fiber coupler;
a graded-index plastic optical fiber having one end that is optically coupled to the 1×2 optical fiber coupler and another end that has an end face disposed within an interior space of the storage tank;
a photodetector optically coupled to the 1×2 optical fiber coupler and configured to generate electrons in response to impingement on a surface of the photodetector of photons of a laser pulse emitted at a first time by the laser device;
a time delay detection circuit operatively coupled to receive electrons from the photodetector and configured to generate time delay signals representing a time delay between impingement on the photodetector surface of first photons of the laser pulse at a second time subsequent to the first time and second photons of the laser pulse at a third time subsequent to the second time; and
a computer system operatively coupled to receive the time delay signals from the time delay detection circuit and configured to calculate a level of liquid in the storage tank based on the time delay.

10. The system as recited in claim 9, wherein the graded-index plastic optical fiber has a numerical aperture of at least 2.9.

11. The system as recited in claim 9, wherein the photodetector is an avalanche photodiode configured to operate in a Geiger mode.

12. The system as recited in claim 9, wherein the laser device comprises a red laser diode that operates around 650 nm.

13. The system as recited in claim 9, wherein the laser device is capable of emitting a laser pulse having a width of 100 psec or less.

14. The system as recited in claim 9, further comprising a display device communicatively coupled to the computer system, wherein the computer system is further configured to execute the following operations:
storing data representing a geometry of the storage tank;
receiving data representing a measurement of a density of the liquid in the storage tank;
calculating a mass of liquid remaining in the storage tank based on the geometry of the storage tank, the density of the liquid and the level of liquid; and
outputting an electrical signal representing the calculated mass of liquid in the storage tank to the display device.

15. The system as recited in claim 9, wherein the liquid is fuel and the storage tank is a fuel tank onboard an airplane.

16. An aircraft comprising a fuel tank and a fuel level sensing system for measuring a level of liquid in the fuel tank, wherein the fuel level sensing system comprises:
a 1×2 optical fiber coupler disposed outside of the fuel tank;
a laser device optically coupled to the 1×2 optical fiber coupler and configured to emit a laser pulse of photons that propagates toward the 1×2 optical fiber coupler;
a graded-index plastic optical fiber having one end that is optically coupled to the 1×2 optical fiber coupler and another end that has an end face disposed within an interior space of the fuel tank;
a photodetector optically coupled to the 1×2 optical fiber coupler and configured to generate electrons in response to impingement on a surface of the photodetector of photons of a laser pulse emitted at a first time by the laser device;
a time delay detection circuit operatively coupled to receive electrons from the photodetector and configured to generate time delay signals representing a time delay between impingement on the photodetector surface of first photons of the laser pulse at a second time subsequent to the first time and second photons of the laser pulse at a third time subsequent to the second time; and
a computer system operatively coupled to receive the time delay signals from the time delay detection circuit and configured to calculate an estimated level of liquid in the fuel tank based on the time delay.

17. The aircraft as recited in claim 16, wherein the graded-index plastic optical fiber has a numerical aperture of at least 2.9, the photodetector is an avalanche photodiode configured to operate in a Geiger mode, and the laser device comprises a red laser diode.

18. The aircraft as recited in claim 16, further comprising a display device communicatively coupled to the computer system, wherein the computer system is further configured to execute the following operations:
storing data representing a geometry of the fuel tank;
receiving data representing a measurement of a density of the liquid in the fuel tank;
calculating a mass of liquid remaining in the fuel tank based on the geometry of the fuel tank, the density of the liquid and the estimated level of liquid; and
outputting an electrical signal representing the calculated mass of liquid in the fuel tank to the display device.

19. The system as recited in claim 9, further comprising:
an airtight and light-tight fiber feed-through connector that comprises a fiber ferrule in the form of a circular cylindrical tube and an annular flange projecting radially outward from the fiber ferrule; and opaque epoxy that surrounds and secures a distal end of the graded-index plastic optical fiber inside the fiber ferrule, wherein the fiber ferrule passes through a hole in a top wall of the storage tank, the annular flange is attached to the top wall of the storage tank, and an end face of the graded-index plastic optical fiber is exposed inside the storage tank.

20. The aircraft as recited in claim 16, wherein the fuel level sensing system further comprises:

an airtight and light-tight fiber feed-through connector that comprises a fiber ferrule in the form of a circular cylindrical tube and an annular flange projecting radially outward from the fiber ferrule; and opaque epoxy that surrounds and secures a distal end of the graded-index plastic optical fiber inside the fiber ferrule, wherein the fiber ferrule passes through a hole in a top wall of the storage tank, the annular flange is attached to the top wall of the storage tank, and an end face of the graded-index plastic optical fiber is exposed inside the storage tank.

21. The aircraft as recited in claim 16, wherein the length of graded-index plastic optical fiber is selected such that an optical loss of the length of graded-index plastic optical fiber is not excessive.

22. The aircraft as recited in claim 16, wherein the computer system comprises:

a fuel level calculator configured to calculate a fuel level based on the time delay output by the time delay detection circuit; and a fuel quantity processing unit configured to calculate a fuel quantity based on the fuel level output by the fuel level calculator.

23. The aircraft as recited in claim 22, wherein the computer system comprises:

a fuel quantity optical data concentrator connected to receive the fuel level from the fuel level calculator; and a multi-master serial bus that communicatively couples the fuel quantity optical data concentrator to the fuel quantity processing unit.

24. The aircraft as recited in claim 23, further comprising a temperature sensor that measures a temperature of fuel in the fuel tank, wherein the fuel quantity optical data concentrator is connected to receive the temperature from the temperature sensor.

25. The aircraft as recited in claim 23, further comprising a densitometer that measures a density of fuel in the fuel tank, wherein the fuel quantity optical data concentrator is connected to receive the density from the densitometer.

* * * * *